US009813300B2

(12) United States Patent
Yu et al.

(10) Patent No.: US 9,813,300 B2
(45) Date of Patent: Nov. 7, 2017

(54) MEDIA FLOW TRACING IN THIRD PARTY DEVICES

(71) Applicant: Cisco Technology, Inc., San Jose, CA (US)

(72) Inventors: Eric Yu, Philadelphia, PA (US);
Michael O'Brien, Manasquan, NJ (US); Aamer Akhter, Cary, NC (US);
Salman Asadullah, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 828 days.

(21) Appl. No.: 13/652,585

(22) Filed: Oct. 16, 2012

(65) Prior Publication Data

US 2014/0105038 A1 Apr. 17, 2014

(51) Int. Cl.
*H04L 12/24* (2006.01)
*H04L 12/26* (2006.01)

(52) U.S. Cl.
CPC ............ *H04L 41/12* (2013.01); *H04L 43/065* (2013.01); *H04L 43/087* (2013.01); *H04L 43/0835* (2013.01); *H04L 43/0894* (2013.01)

(58) Field of Classification Search
CPC . H04L 43/065; H04L 43/087; H04L 43/0894; H04L 41/12; H04L 43/0835
USPC ................................. 370/252, 225, 230, 329
See application file for complete search history.

(56) References Cited

U.S. PATENT DOCUMENTS

| | | | |
|---|---|---|---|
| 7,496,044 B1* | 2/2009 | Wing | 370/242 |
| 7,746,796 B2 | 6/2010 | Swallow et al. | |
| 2007/0183317 A1* | 8/2007 | Vasseur et al. | 370/225 |
| 2009/0116443 A1* | 5/2009 | Walker et al. | 370/329 |
| 2009/0180448 A1* | 7/2009 | Kobayashi | H04W 40/08 370/338 |
| 2010/0265947 A1* | 10/2010 | Kokot et al. | 370/390 |
| 2012/0236713 A1* | 9/2012 | Kakadia et al. | 370/230 |
| 2013/0343381 A1* | 12/2013 | Klimker | 370/389 |

OTHER PUBLICATIONS

E. Rosen et al., "BGP/MPLS IP Virtual Private Networks (VPNs)", Network Working Group, RFC 4364, Feb. 2006.
S. Cheshire et al., "DNS-Based Service Discovery", Internet Engineering Task Force, Dec. 9, 2011.
(Continued)

*Primary Examiner* — Shaq Taha
*Assistant Examiner* — Pamit Kaur

(57) ABSTRACT

In one implementation, performance statistics for a provider network are compiled and delivered outside of the provider network. The provider network includes a media trace proxy server that receives a media trace query for a media stream of a customer edge network device. The media trace proxy server initiates a route discovery process on the provider network in response to the request or in response to at least one network device in the provider network being nonresponsive to similar types of media trace queries. The media trace proxy server collects performance statistics from the at least one network device and forwards the performance statistics of the at least one network device to the customer edge network device. The performance statistics may include only those statistics authorized by a subscription level or administrative region of the customer edge network device.

17 Claims, 6 Drawing Sheets

(56) References Cited

OTHER PUBLICATIONS

Aamer Akhter "Mediatrace: Better Traceroute that does the Walking for you", Cisco Blog, http://blogs.cisco.com/borderless/mediatrace/, Mar. 17, 2011.
"netVmg's Flow Control Pattern (FCP) puts you in the driver's seat", netVmg, writing sample is part of David Almquist's B2B Copywriting website, http://www.davidwriter.com/netvmgw/index.html, downloaded from the internet, last accessed May 23, 2017, 2 pages.
"Cisco MPLS Diagnostics Expert—At-A-Glance", Cisco Systems, DM/LW10009, Dec. 2005, Dec. 2005, 2 pages.
"Cisco Service Advertisement Framework Fundamentals", Cisco, White Paper, C11-622512-00, Sep. 2010, Sep. 2010, 9 pages.

\* cited by examiner

MEDIA FLOW TRACING IN THIRD PARTY DEVICES

TECHNICAL FIELD

This disclosure relates in general to the field of troubleshooting media streams in internet protocol (IP) communication, more particularly, to troubleshooting media streams in third party devices.

BACKGROUND

Utilities, such as traceroute and pathping, are available for displaying a route of a packet across a network. Successive packets are sent across the network with varying hop limits. Return messages produce a list of routers that the packets have traversed. Timestamps included in the return messages may describe delays of the packets. This information provides operators data for each hop along a path to the destination, however these utilities generally return only the internet protocol (IP) addresses of the intermediate routers.

Some devices may be configured with more sophisticated performance utilities capable of returning performance measurements in addition to the IP addresses of the intermediate routers. These sophisticated utilities are proprietary and can be utilized only to the extent that networks include routers enabled with the same software. Networks with routers from multiple vendors or with legacy routers not enabled with the same performance utilities cannot be monitored for the more sophisticated performance measurements. In addition, network address translation devices and firewalls often block the sophisticated performance utilities.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, a request to troubleshoot a media stream is received from a customer edge network device. In response, a route discovery process on a provider network is initiated and performance data of at least one provider network device in the provider network as learned by the route discovery process is collected in response to the request to troubleshoot the media stream. The performance data of at least one provider network device is forwarded to the customer edge network device.

In another embodiment, a network device includes at least a communication interface and a controller. The communication interface is configured to receive a request to troubleshoot a media stream from a customer network device. The controller is configured to perform a route discovery process on a provider network to identify incompatible network devices in the provider network that are not reachable by the customer network device and configured to collect performance data of the incompatible network devices in the provider network.

In another embodiment, a computer readable medium includes instructions to receive a media trace query for a media stream from a customer edge network device, identify whether network devices in a provider network respond to the media trace query, collect performance statistics from at least one network device in response to the at least one network device in the provider network being nonresponsive to the media trace query, and forward the performance statistics of the at least one network device to the customer edge network device.

Example Embodiments

The disclosed embodiments relate to troubleshooting media streams in third party devices by extending packet performance troubleshooting features into the service provider space and providing integration for third party devices. A customer device initiates a diagnostic routine across a provider network. A media trace device collects statistics across the provider network. The statistics may include a hop-by-hop performance report from the network devices in the provider network. The statistics include performance statistics from at least one network device in the provider network that is not configured to provide performance information directly to the customer device. Such a network device may not be reachable by the customer device or may not be configured with software compatible to the diagnostic utilities of the customer device. Because the media trace device is part of the provider network, the media trace device can query the network device that would not normally communicate or be compatible with the customer device. Alternatively, a network management system may generate performance statistics for the provider network and provide the performance statistics to the media trace device.

Figure 1:
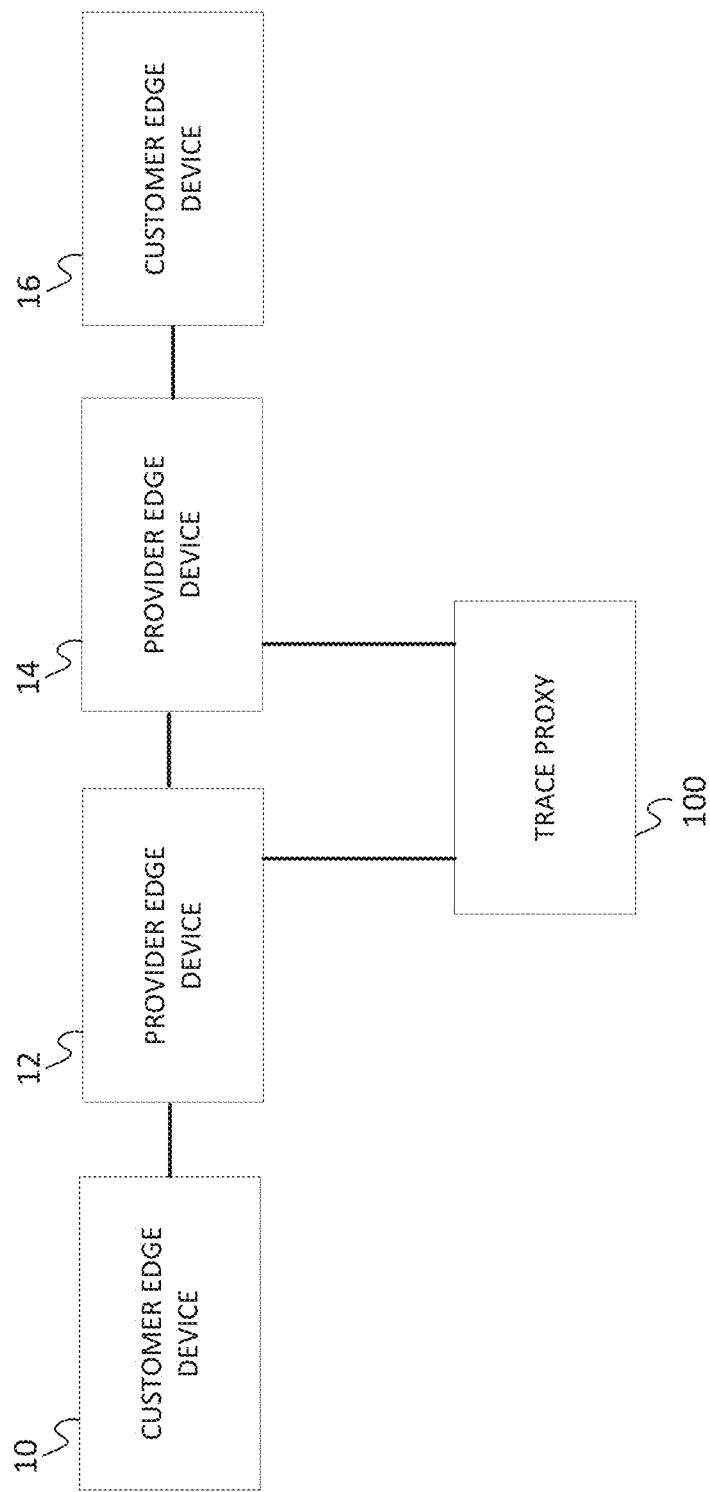
FIG. 1 illustrates an example of a provider network coupled to customer networks.

FIG. 1 illustrates an example provider network coupled to customer networks. The provider network may be referred to as a multi-hop network. One of the customer networks includes customer edge device 10 and another of the customer networks includes customer edge device 16. A provider network, including the provider edge devices 12 and 14, connects the customer networks. A media stream flows between the customer edge device 10 and the customer edge device 16, passing through the provider edge devices 12 and 14. Additional, fewer, or different nodes may be included in the provider network or the customer networks. For example, only one provider edge device 12, 14 is used in the media stream.

The provider network is a service provider that provides connectivity to the customer network. The connectivity may be to the internet, other customer networks, or other portions of the customer network, such as a virtual private network. This network segment between the provider and the customer sets the demarcation point between different administrative boundaries. It is at this boundary where separate access policies are enforced to limit mutual network visibility. In cases where wide area network managed services are employed, this may change the administrative domains. The customer network may be a single enterprise, a set of enterprises, an internet service provider, an application service provider, a virtual private network provider, or another entity. The customer network may be geographically spaced from the provider network. The provider network may provide a virtual private network (VPN) to the customer network.

Each customer edge device is attached to the provider edge device using an attachment circuit. An attachment circuit may include a data link or a tunnel. Example attachment circuits use virtual circuits, frame relay, Ethernet, virtual local area networks, generic route encapsulation (GRE) tunnels, layer 2 tunneling protocol, multiprotocol label switching (MPLS), or other connections. The attachment circuit that a packet travels over from the customer edge device to the provider edge device is an ingress attachment circuit for the packet. The attachment circuit that a packet travels over from the provider edge device to the customer edge device is the egress attachment circuit. In addition, a customer edge device may be connected to a provider edge device by a layer 2 switch.

The media trace proxy server 100 is coupled to the provider edge devices 12 and 14. The customer edge device 10 includes a media trace utility. The media trace utility tracks a media flow between the customer edge device 10 and the customer edge device 16 and gathers performance statistics for hops along the media flow. However, at least one of the hops (e.g., provider devices) along the flow is not compatible with the media trace utility of the customer edge device 10. The media trace proxy server 100 allows performance statistics for devices on the provider edge network that are not compatible with the media trace utility to reach the customer edge device 10. The media trace proxy server 100 is configured to perform a discovery process, a performance statistics collection process, and a reporting process.

In the discovery process, the media trace proxy server 100 may discover or become aware of the existence of the routers in the provider network. The routers may include provider edge devices 12 and 14, as well as other devices. The routers may generate and send router advertisements that announce the existence of the routers. The router advertisements may be sent periodically (e.g., 5 seconds, 1 minute, 10 minutes, or another time period). The router advertisements may be sent to every interface of the routers, and accordingly, reach every other device within and coupled to the provider network.

Alternatively, the media trace proxy server 100 may generate a router solicitation and send the router solicitation to the routers. The routers respond with router advertisements. Router advertisements are data packets that include a source IP address and an advertisement lifetime value. The advertisement lifetime value sets a time period that the source IP address is valid. The router is configured to send another router advertisement before the time period expires.

Through the discovery process, the media trace proxy server 100 becomes aware of all or a subset of the routers on the provider network. The media trace proxy server 100 may store the addresses of the routers on the provider network in a database or memory as a network map, a router table, or other collection.

In the performance statistics collection process, the media trace proxy server 100 accesses the network map for IP addresses to send a message to each of the routers on the provider network requesting performance statistics. The performance statistics may include a packet drop count, a data flow count, a packet count, a packet drop reason, a data rate, a jitter rate, a packet loss percentage, a confidence level, packet delay value, or other statistics from each of the routers on the provider network. The packet drop count states the number of packets dropped at the router, as determined by the router. The data flow count states the amount of data in the media flow forwarded by the router. The packet count states the number of packets in the media flow forwarded by the router. The packet drop reason includes a diagnostic code that indicates a predicted reason that packets were dropped. The data rate is a current rate of data for the media flow measured in bits per second. The jitter rate is the average amount of jitter per packet measured in microseconds. The packet loss percentage is a percentage of the number of packets received compared to the expected packets. The confidence level is a statistical measure of the accuracy of the performance statistics. The confidence level may indicate whether outliers in the data have been detected. Additional, different, or fewer performance statistics may be used.

The media trace proxy server 100 is configured to collect the performance statistics and compile the performance statistics into a media path table, which is stored in memory. The media path table may be arranged according to media flows or according to administrative network domains networks. Alternatively, separate media path tables may be generated for separate media flows for logically different administrative network domains.

The performance statistics collection process may be performed periodically (e.g., every 1, 5, or 10 minutes) or in response to a request. For example, the media trace proxy server 100 may receive a request to troubleshoot a media stream from the customer edge network device 10. The media trace proxy server 100 satisfies the request by forwarding the media path table, including performance data of at least one provider edge network device, for the given media stream to the customer edge network device 10.

Figure 2:
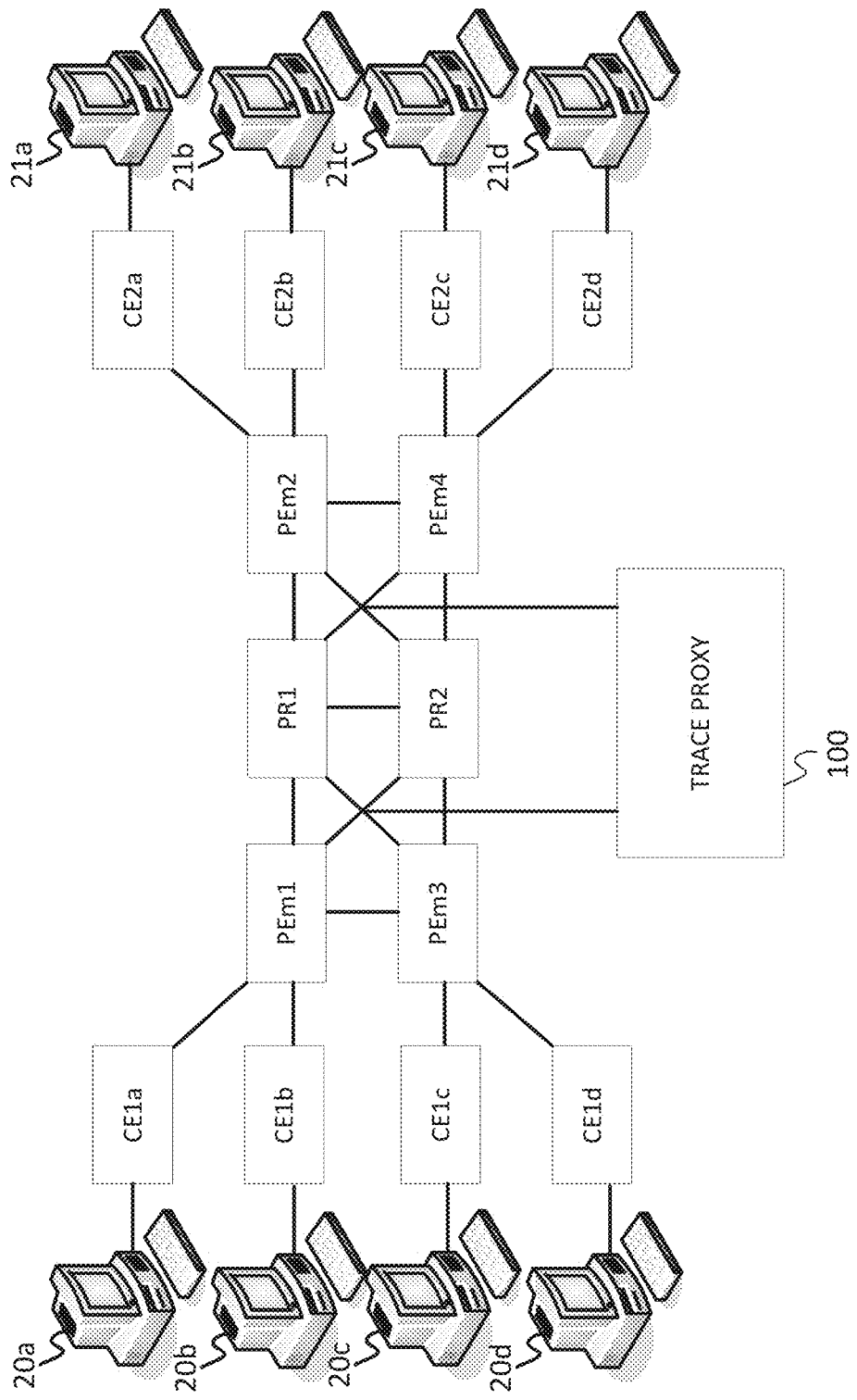
FIG. 2 illustrates another provider network coupled to customer networks.

FIG. 2 illustrates another provider network coupled to customer networks. A first customer network includes end user devices 20a-d and customer edge network devices CE1a-d. A second customer network includes end user devices 21a-d and customer edge network devices CE2a-d. The provider network includes provider edge network devices PEm1-4 and provider devices PR1 and PR2. Either directly or indirectly, the media trace proxy is coupled to all of the network devices of the provider network.

In one example, the provider devices PR1 and PR2 may be unavailable to the customer device using the media trace utility because of a policy of the provider network. In another example, the provider devices PR1 and PR2 are not visible to the customer edge network devices because of the structure of the provider network. In another example, the provider devices PR1 and PR2 are incompatible with the media trace utility of the customer because the provider devices PR1 and PR2 lack a server side software component of the media trace utility. Any combination of these situations may be present. Other situations may result in one or more provider devices not providing performance statistics in response to a medial trace from a customer.

Figure 3:
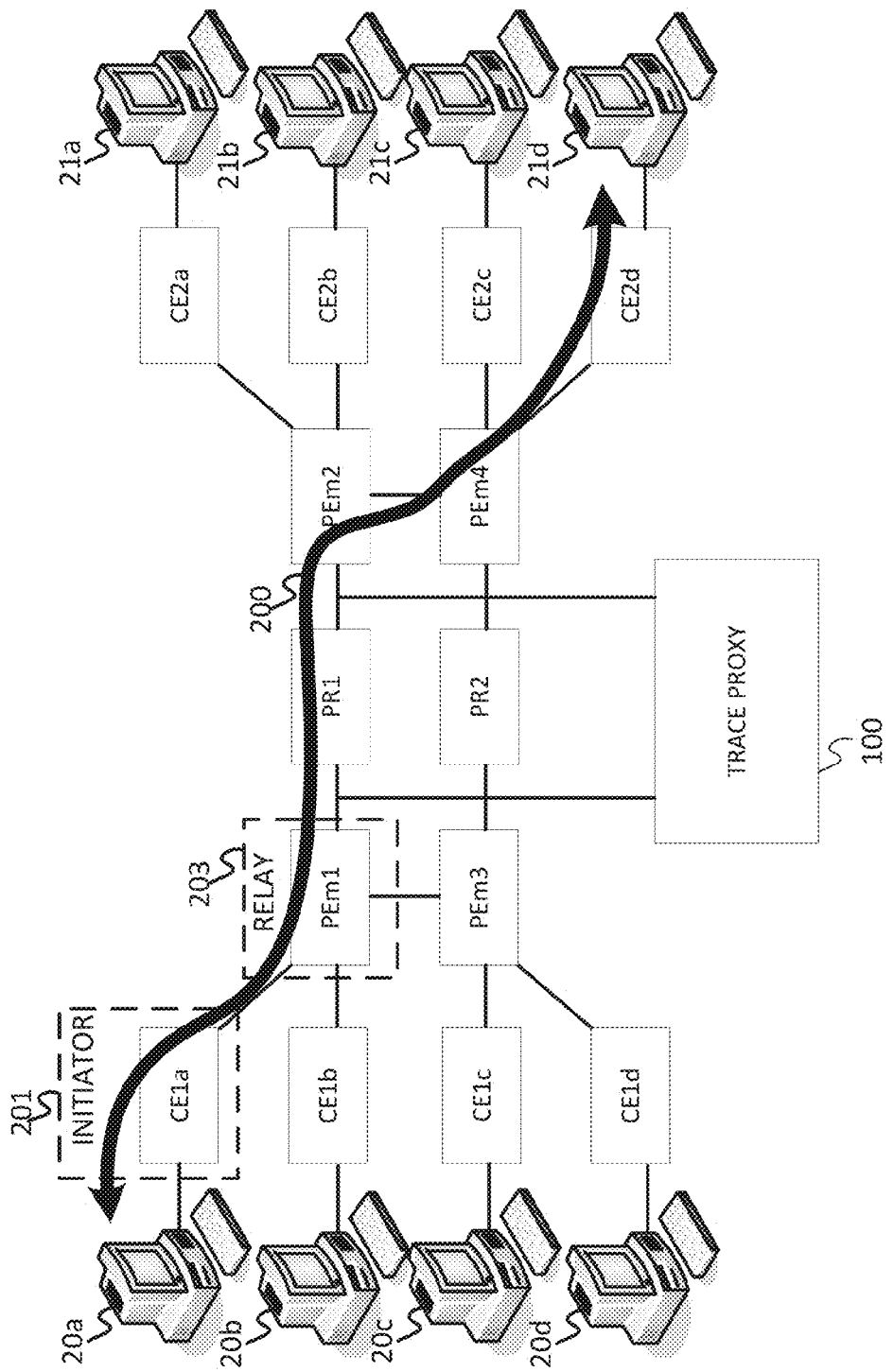
FIG. 3 illustrates the networks of FIG. 2 and a media flow.

FIG. 3 illustrates the networks of FIG. 2 and an example media flow 200. The media flow 200 is a dedicated flow of packets between two customer networks. The media flow 200 may be a voice over internet protocol (VoIP) call, a video transmission between the end user device 20a and the end user device 21d, or any type of flow. The media trace signaling message can be established in parallel with media flow [200] using a protocol such resource reservation protocol (RSVP) as published in RFC 2205 in 1997. The signaling message is established in parallel based on the 5 tuple information of the media flow 200. The signaling messages are routed thru each node along the media path necessary to collect quality of service, session flow, and system performance metrics.

The media trace utility may rely on a transport protocol. The end user device 20*a* may originate the media flow 200 to end user device 21*d*. The signaling message employed as a transport protocol is used to request performance statistics for the media flow 200 on a path which includes, but is not limited to, nodes PEm1, PR1, PEm2, and PEm4 as network devices that forward packets of the media flow. Other paths may be negotiated.

At least one of the nodes, for example PR1, is not configured to respond to requests from the media trace utility of the customer. The node may be incompatible with the media trace utility or otherwise lack the software for responding to queries from the media trace utility. This drawback in the media trace utility may be avoided by reconfiguring the media trace utility to communicate with a media trace relay and/or the media trace proxy server 100.

For example, the customer edge device CE1*a* is an initiator 201 that initiates a media trace query. The media trace query is sent to node PEm1, which acts as a media trace relay 203. The media trace relay 203 forwards the media trace query to the media trace proxy server 100. The media trace relay 203 relays the performance statistics collected by the media trace proxy server 100 to the initiator 203. The media trace relay 203 may forward the performance statistics to the initiator as a response to the media trace query. The initiator 201 may not be aware that the media trace proxy server 100 was involved in the process.

Either the initiator 201 or the relay 203 may be configured to automatically determine whether to use the media trace proxy server 100 based on whether or not all of the nodes of the provider network are responsive to a media trace query. For example, the media trace query may be initially replicated and sent to all nodes in the provider network or provider nodes used by the media flow 200. A determination of responsiveness is based on replies from the nodes.

The media trace query may be distributed to the nodes in the network by first replicating the media trace query and forwarded to selected interfaces involved with routing the media packet. This is repeated at every device hop until the destination of the media flow is reached. As the packets traverse the provider network, the time to live value is decremented. If any of the nodes are not configured to respond to the media trace query, there are metric gaps in the set of response reports. These gaps in the time to live of the media trace report indicate that some of the routers are not configured to respond to the media trace utility. In response to the gaps in the media trace report, the initiator 201 forwards the media trace query to the media trace proxy server 100 or at least identifies that there is a provider network device along the media path that is not responsive to the media trace query. If no gaps appear in the media trace report, no further action may be necessary. The case where a relay is deployed to query a media trace proxy server on behalf of the customer edge initiator applies only when the provider off loads query process to its provider edge device.

In addition, the initiator 201 or the relay 203 may determine whether one or more of the provider network devices are responsive to the media trace utility because the media trace query was dropped at a particular node. The node may drop the media trace query because of a firewall or a network address translation device.

The media trace query may be in the format of RSVP. The media trace query follows the same path as the media packets because the media trace query is routed in the same manner as the media packets according to the routing table constructed by a routing protocol. As a consequence, the media trace query is in a single direction. In other words, the media flow and the media trace are simplex flows in one direction. For example, a different media trace query is used to gather statistics regarding a media flow from end user device 20*a* to end user device 21*d* than the media trace query used to gather statistics from a media flow from end user device 21*d* to end user device 20*a*. The request to troubleshoot a media stream from a customer edge network device may also be in the form of an RSVP message. The response message including performance statistics returned to the initiator 201 may also be in the form of an RSVP message.

Another application for the media flow and media trace query may be real time transport protocol (RTP). Because the header of the media trace query includes a label that is also included in the media packets, both the media trace query and the packets carrying media payloads follow the same media path.

The media trace proxy server 100 receives the request to troubleshoot a media stream. The request is received either directly from a customer edge network device or from the provider edge network device. The media trace proxy server 100 performs a route discovery process on the provider network. The route discovery process may be performed in response to the request or media trace query, or the route discovery process may be performed at a predetermined interval (e.g., may have been previously performed).

The provider network may be connected in a variety of configurations. In a fully connected topology, every node is directly connected to every other node. In a mesh topology, as shown in FIG. 2, every node is directly connected to several other nodes. In a ring topology, as shown in FIG. 3, every node is directly connected to two other nodes. A tree topology, a star topology, as well as other topologies are possible. Depending on the topology of the provider network, multiple parallel paths between the source and destination of the media flow are possible. A single media application may use one path for video and another path for audio. Regardless of the topology, the media trace proxy server 100 is configured to communicate with all or a specific subset of nodes of the provider network through the route discovery process, and accordingly, gather statistics from all or a specific subset of possible paths.

The route discovery process allows the media trace proxy server 100 to build a map of the topology of the provider network. The route discovery process may use a combination of techniques on either the data link layer (layer 2) or network layer (layer 3). The layer 3 protocols include open shortest path first (OSPF) routing protocol as defined by RFC 2328 published in 1998 and RFC 5340 publish in 2008, intermediate system to intermediate system (ISIS) routing protocol as defined by RFC 1142 and published in 1990, or border gateway protocol (BGP) as defined by RFC 4271 and published in 2006. The layer 2 protocols include Cisco discovery protocol (CDP), link layer discovery protocol (LLDP), multiprotocol label switching (MPLS), operation-administration-maintenance (OAM) tools, or Ethernet OAM tools. The route discovery process may include a software utility such as traceroute and pathping, which involve successive packets sent across the provider network with varying hop limits. The route discovery process determines all the paths through the provider network including compatible and incompatible network devices.

The route discovery process may be performed by the media trace proxy server 100 in response to the media trace query or in response to an elapsed time period. The time period may be predetermined or set by the user. The media trace proxy server 100 builds a map of the provider network based on the reply messages in the route discovery process and stores the map of the provider network. The map of the provider network may be periodically updated according to the time period.

The media trace proxy server 100 performs the performance statistics collection process according to the map of the provider network. The media trace proxy server 100 is configured to send a performance inquiry message to each network device included in the provider network map. Alternatively, the media trace proxy server 100 sends a query message to each network device along the media path associated with the media trace query. In response to the query messages, the provider devices send system performance statistics in the respective inquiry format back to the media trace proxy. The provider network devices send the data packets including such performance statistics to the media trace proxy server 100.

The collection of the performance statistics may be performed through network management protocols. The network management protocols may include one or more of NetFlow, simple network management protocol (SNMP), simple object access protocol (SOAP), or another network management protocol. The media trace proxy server 100 sends the performance statistics to relay 203, which forwards the performance statistics to the initiator 201, for display at the end user device 20*a*.

Figure 4:
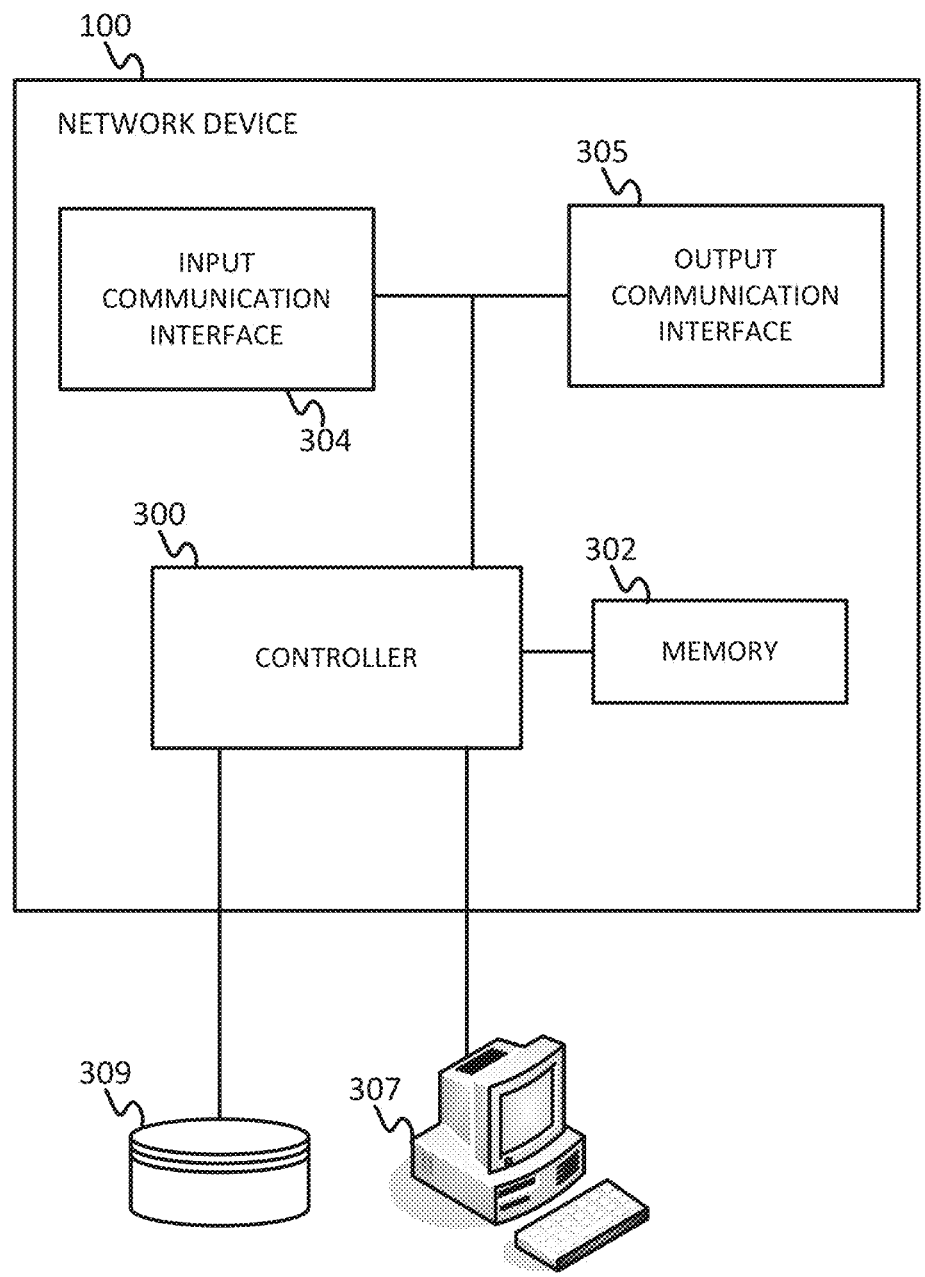
FIG. 4 illustrates an example network device configured for media flow tracing in third party devices.

FIG. 4 illustrates an example network device (media trace proxy server or other device) 100 configured for media flow tracing in third party devices. The network device 100 includes at least a controller 300, a memory 302, an input communication interface 304, and an output communication interface 305. The network device 100 may also communicate with a workstation 307 and a database 309. Additional, different, or fewer components may be provided. The network devices in the provider and customer networks may have the same or different arrangement of components.

The controller 300 includes logical circuitry or hardware for performing media flow tracing in third party devices. The input communication interface 304 is configured to receive a request to troubleshoot a media stream from the customer edge network device. In response to the request, the controller 300 is configured to perform a route discovery process on a provider network to identify network devices in the provider network that are not reachable by the customer edge network device and collect performance data of the network devices in the provider network.

Figure 5:
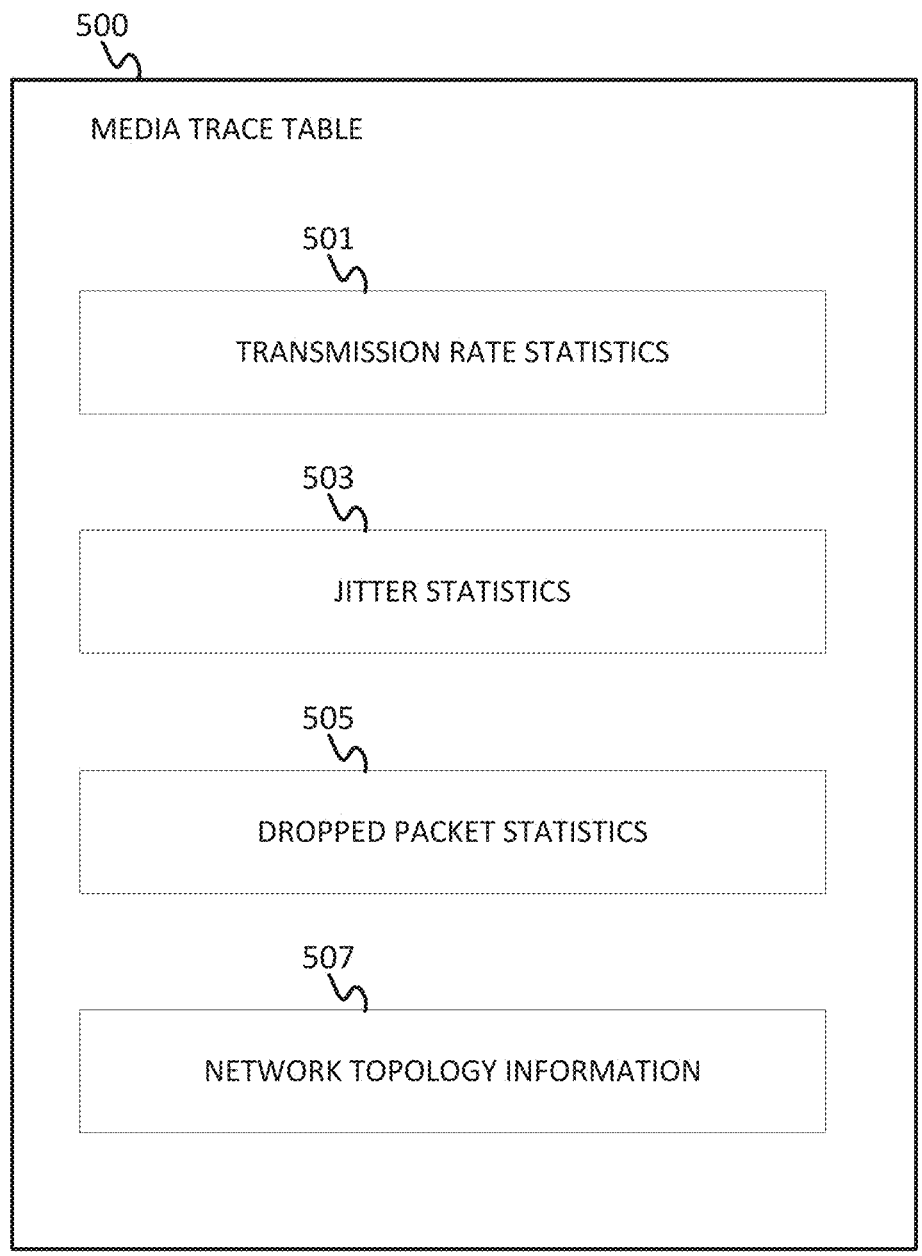
FIG. 5 illustrates an example media trace table.

The controller 300 compiles the performance data of the network devices in the provider network into a media trace table. The network device 100 may store the media trace table in the database 309. FIG. 5 illustrates an example media trace table. The performance statistics in the media trace table 500 may include one or more of transmission rate statistics 501, jitter statistics 503, or dropped packet statistics 505 associated with IP address of the network devices in the provider networks. The media trace table may also include topology information 507 that describes the topology of the provider network. The media trace table may also include interface information (incoming and outgoing), hostnames, and the quality of service (QOS) values. The quality of service values allow the provider network to prioritize various media flows according the importance of the media. For example, VoIP may be prioritized over video streams. Additional, different, or fewer data may be included in the media trace table 500.

The topology information 507 may identify which of the network devices are reachable from the customer edge network device and which of the network devices are not reachable from the customer edge network device. In addition or in the alternative, the topology information 507 may include whether the network devices are configured to reply to a media trace query.

The performance statistics may be collected on a predetermined interval. The predetermined interval may be user determined by an input entered at workstation 307. Any interval is possible, and example intervals include 10 seconds and 10 minutes. Alternatively, the performance statistics are collected in response to the request to troubleshoot the media stream from the customer edge network device.

The provider network may provide the performance statistics according to a subscription to the performance statistics. For example, the provider may sell the customer access to the performance statistics. The customer may prefer to subscribe to the performance statistics to monitor the levels of service received from the service provider. Various subscription levels may entitle the customer access to different portions of the performance statistics.

The controller 300 may be configured to identify the customer edge network device that sent the request to troubleshoot the media stream. The database 309 may store a list of customer networks and subscription levels. The subscription levels may be defined on a customer network basis or on an individual user basis to give more access to customer administrators. The controller 300 queries the database 309 with the identity of the customer edge network device in order to determine a subscription level. The controller 300 selects the performance statistics to send to the customer edge network device according to the subscription level. In one example, the customer edge network device is given access to the media flows sent to or from the associated customer network. This gives a customer visibility into the service provider network for media flows of the customer that are traversing the provider network, but avoids security concerns from providing data for other media flows of other customers.

The customer device may incorporate a credential or security key into the request to troubleshoot the media stream. The media trace proxy server 100 receives the credential from the customer edge network device and verifies from the credential that the customer edge network device has access to the performance data of at least one provider edge network device. For example, the media trace proxy server 100 accesses the database 309 to verify the credential.

The media trace proxy server 100 may also organize and store the performance statistics according to the administrative regions. The database 309 stores a list of administrative regions based on the credential. As the media trace proxy server 100 receives performance data, the performance data is stored according to the administrative regions. When the credential is received, the media trace proxy server 100 matches the credential to the administrative region including the customer edge network device.

The map of the provider network is divided into administrative regions. Each of the administrative regions may be associated with a customer network and associated with a privacy policy and an access level to the performance subscription. The node PEm1 may act as the initiator and collect the performance statistics from the network devices on behalf of the customer device.

The controller 300 may include a general processor, digital signal processor, an application specific integrated circuit (ASIC), field programmable gate array (FPGA), analog circuit, digital circuit, combinations thereof, or other now known or later developed processor. The controller 300 may be a single device or combinations of devices, such as associated with a network, distributed processing, or cloud computing.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may be removable from the network device 101, such as a secure digital (SD) memory card.

In addition to ingress ports and egress ports, the input communication interface 304 and the output communication interface 305 may include any operable connection. An operable connection may be one in which signals, physical communications, and/or logical communications may be sent and/or received. An operable connection may include a physical interface, an electrical interface, and/or a data interface.

Figure 6:
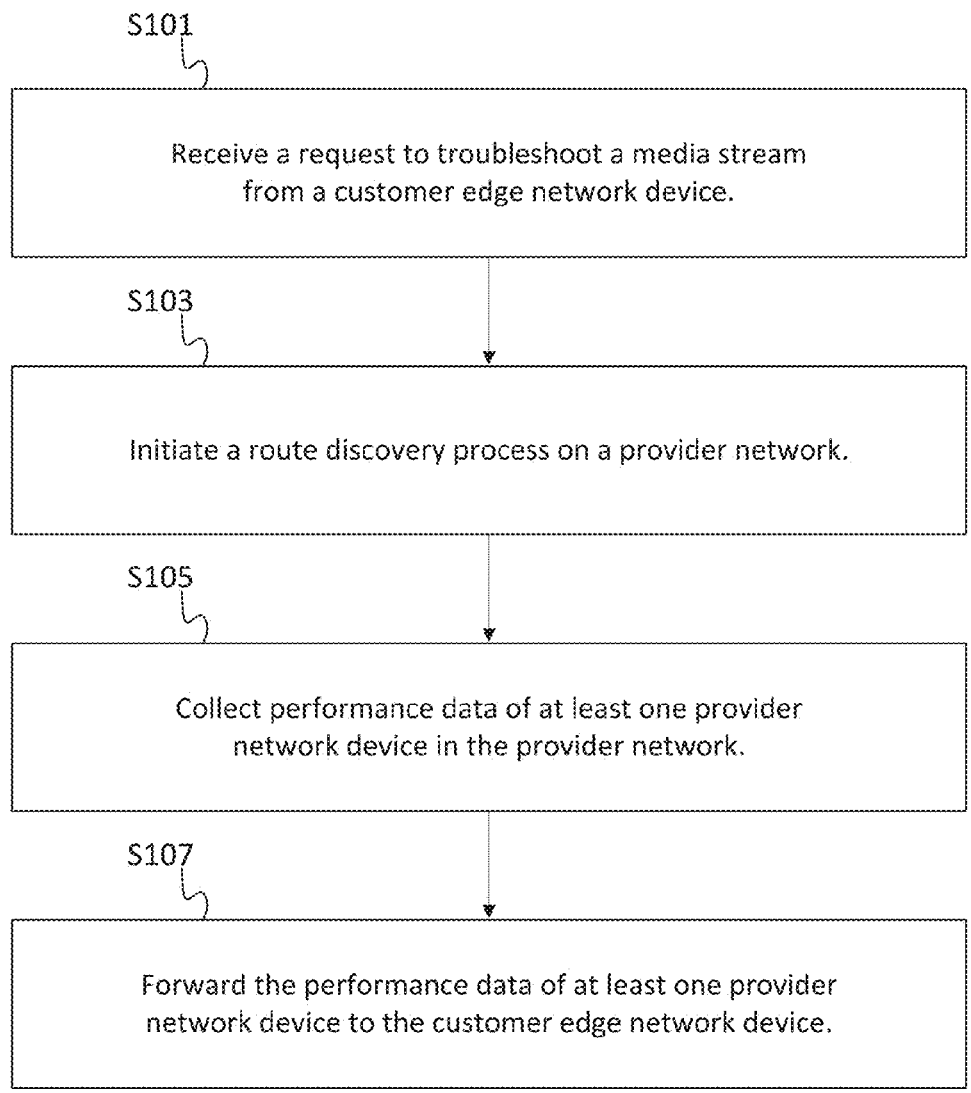
FIG. 6 illustrates an example flowchart for media flow tracing in third party devices.

FIG. 6 illustrates an example flowchart for media flow tracing in third party devices. The acts of the flowchart may be performed in the order shown or a different order. Additional, different, or fewer acts may be provided. The acts of the flowchart may be performed by the media trace proxy server 100, a media trace rely (e.g., PEm1), or another device with access to the provider network. These devices may be referred to alternatively as the trace device.

At act S101, the trace device receives a request to troubleshoot a media stream. The request may originate with a customer who has experience dropped packets or a lack of connectivity. The request may include the IP address of the requestor as well as a security credential to verify that the customer is authorized to receive performance statistics from the provider network.

At act S103, the trace device initiates a route discovery process on the provider network. The route discovery process may be performed directly by the trace device through sending and receiving discovery messages. Alternatively, the trace device may send a command to a network management system to perform the route discovery process or return data based on a previous route discovery process. The network management system may generate a media trace table that lists the network devices and media trace capabilities of the network devices. The media trace table may include a flag corresponding to each network device that is not compatible with the media trace utility or is not reachable from outside the provider network.

At act S105, the trace device collects performance data of the at least one provider network device in the provider network. The trace device may collect the performance data directly from the network devices. Alternatively, the trace device may request the performance data from the network management system. The network management system may periodically collect performance data from the network devices and store the performance data in a report in memory. A user may specify an interval for the collection of performance data, which is sent to the network management system from the trace device. The interval may be specified by a subscription level of the customer network. Alternatively, the network management system may collect and forward the performance data in response to a command from the trace device, which is sent in response to the request to troubleshoot the media stream in act S101.

The media trace device may also identify the path of the media flow based on data (e.g., routing table) from the network management system. In one example, there are multiple equivalent paths. Equivalent paths occur when the routing table includes equal cost paths from source to destination across the provider network. The media trace device may select a path as the most likely path for the media path or may provide performance data for the multiple paths.

In one example, the trace device may eliminate the paths that are not in use. This is done by looking at flow reporting mechanism from the network management system. The media trace device requests that the network management system reveal the interfaces that are used for the media packets in the media path.

In another example, the trace device sends requests directly to the network devices in the provider network. The requests may be in the form of the "show" command. The trace device may be capable of logging into the provider network devices using Telnet or another service.

In another example, the trace device may deduce the selected media path based on the map of the provider network. The media trace device may use an equal cost path (ECMP) algorithm that compares possible routes in the map of the provider network.

The trace device may also verify that the requestor has access to the performance data of network devices of the provider network based on a credential received from the requestor. If such access is authorized, the trace device forwards the performance data of the at least one provider network device to the requestor at act S106.

The processes and devices above for media trace relay may be applied to all types of provider networks. In one example, the provider network may be a cellular network. The network devices in the provider network may include wireless endpoints. The customer device may be a mobile phone receiving a media flow of video across the cellular network. When the video is interrupted, the customer sends a request from the mobile device that initiates performance statistics collection from the towers in the geographic region of the mobile phone.

The customer device may be configured to analyze the performance data and determine the source of the problem. For example, the customer may identify the router in the provider network that is causing the problem in the media flow. The customer, who previously paid for a certain quality of service but was required to trust the service provider on faith, can audit the service provider. When a problem presents itself, the customer can analyze the performance of the service provider network and inform the service provider of the problem.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    receiving, by a trace device that has experienced dropped packets or a lack of connectivity, a request to troubleshoot a media stream from a customer edge network device;
    initiating, by the trace device sending a command to a network management system, a route discovery process on a provider network, wherein the network management system generates a media trace table that lists network devices and media trace capabilities of the network devices;
    collecting performance data of at least one provider network device in the provider network as learned by the route discovery process and in response to the request to troubleshoot the media stream;
    forwarding the performance data of the at least one provider network device to the customer edge network device; and
    identifying the at least one provider network device from a gap in a time to live sequence of network devices of the provider network, wherein the gap indicates a lack of a response from the at least one provider network device to the route discovery process.

2. The method of claim 1, further comprising:
    determining whether the at least one provider network device is responsive to a media trace query.

3. The method of claim 1, wherein the performance data is subsequently collected periodically at a predetermined time interval.

4. The method of claim 1, wherein the route discovery process is performed in a predetermined time interval, and the performance data is collected only in response to the request to troubleshoot the media stream.

5. The method of claim 1, further comprising:
receiving the media stream from a second customer edge network device.

6. The method of claim 1, further comprising:
receiving a credential from the customer edge network device; and
verifying from the credential that the customer edge network device has access to the performance data of the at least one provider network device.

7. The method of claim 6, further comprising:
accessing a list of administrative regions based on the credential;
storing performance data for each of the administrative regions; and
matching the credential to an administrative region from the list of administrative regions, wherein the administrative region includes the customer edge network device.

8. The method of claim 1, wherein the performance data includes at least one of transmission rate statistics, jitter statistics, or dropped packet statistics.

9. The method of claim 1, further comprising:
determining a subscription level based on an identity of the customer edge network device; and
selecting performance statistics according to the subscription level.

10. A trace device that has experienced dropped packets or a lack of connectivity, the trace device comprising:
a communication interface configured to receive a request to troubleshoot a media stream from a customer network device; and
a controller configured to initiate a route discovery process with a command for a network management system on a provider network, wherein the network management system generates a media trace table that lists network devices and media trace capabilities of the network devices,
the controller configured to identify an incompatible network device in the provider network that is not reachable by the customer network device and configured to collect performance data of the incompatible network device in the provider network,
wherein the communication interface is configured to forward the performance data to the customer network device,
wherein the incompatible network device is identified from one or more gaps in a time to live sequence of the network devices, wherein the one or more gaps indicate a lack of a response from at least the incompatible network device.

11. The trace device of claim 10, wherein the controller collects the performance data in a user defined time interval.

12. The trace device of claim 10, wherein the controller collects the performance data in response to the request to troubleshoot the media stream.

13. The trace device of claim 10, wherein the controller verifies that the customer network device has access to the performance data of the incompatible network device of the provider network based on a credential received from the customer network device.

14. The trace device of claim 10, wherein the performance data includes at least one of transmission rate statistics, jitter statistics, or dropped packet statistics.

15. A non-transitory computer readable medium containing instructions that when executed are configured to:
receive, by a trace device that has experienced dropped packets or a lack of connectivity, a request to troubleshoot a media stream from a customer edge network device;
initiate, by the trace device sending a command to a network management system, a route discovery process on a provider network, wherein the network management system generates a media trace table that lists network devices and media trace capabilities of the network devices;
collect performance data of at least one provider network device in the provider network as learned by the route discovery process and in response to the request to troubleshoot the media stream;
forward the performance data of the at least one provider network device to the customer edge network device; and
identify the at least one provider network device from a gap in a time to live sequence of network devices of the provider network, wherein the gap indicates a lack of a response from the at least one provider network device to the route discovery process.

16. The non-transitory computer readable medium of claim 15, wherein the at least one provider network device is not reachable by the customer edge network device.

17. The non-transitory computer readable medium of claim 15, wherein the media trace query includes a credential defining a subscription level associated with the customer edge network device, and performance statistics are compiled according to the subscription level.

* * * * *